United States Patent
Wei et al.

(10) Patent No.: US 9,404,239 B2
(45) Date of Patent: Aug. 2, 2016

(54) SUB-BIN REFINEMENT FOR AUTONOMOUS MACHINES

(71) Applicant: Caterpillar Inc., Peoria, IL (US)

(72) Inventors: Mo Wei, Dunlap, IL (US); Michael Allen Taylor, Swissvale, PA (US); Thandava Krishna Edara, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 137 days.

(21) Appl. No.: 14/300,221

(22) Filed: Jun. 9, 2014

(65) Prior Publication Data

US 2015/0354169 A1  Dec. 10, 2015

(51) Int. Cl.
*E02F 9/20* (2006.01)
*E02F 9/26* (2006.01)
*G05D 1/02* (2006.01)

(52) U.S. Cl.
CPC ............... *E02F 9/205* (2013.01); *E02F 9/2054* (2013.01); *E02F 9/261* (2013.01); *E02F 9/264* (2013.01); *G05D 1/021* (2013.01)

(58) Field of Classification Search
CPC ....... E02F 9/2045; E02F 9/264; E02F 9/2029; E02F 9/262; E02F 9/205; E02F 9/26; E02F 3/434; E02F 9/2054; E02F 9/267; E02F 3/437; E02F 9/261; G05D 2201/0202; G05D 1/0278; G05D 1/0274; G05D 1/0257; G05D 1/0236; G05D 1/027; G05D 1/028; G05D 1/0297; G05D 1/0891; G05D 2201/0201
See application file for complete search history.

(56) References Cited

U.S. PATENT DOCUMENTS

| | | | | |
|---|---|---|---|---|
| 5,850,341 A * | 12/1998 | Fournier | ............... | E02F 9/2045 342/147 |
| 6,076,030 A * | 6/2000 | Rowe | ...................... | E02F 3/435 172/4.5 |
| 6,363,632 B1 * | 4/2002 | Stentz | ...................... | E02F 3/437 37/348 |
| 7,627,410 B2 * | 12/2009 | Berry | ...................... | E02F 9/2029 701/1 |
| 7,731,450 B2 * | 6/2010 | Congdon | ............... | E01C 19/288 404/84.5 |
| 7,899,598 B2 * | 3/2011 | Woon | ...................... | E02F 3/842 172/1 |
| 8,364,353 B2 * | 1/2013 | Kiegerl | ...................... | E02F 1/00 700/245 |
| 8,620,535 B2 | 12/2013 | Friend et al. | | |
| 8,838,331 B2 * | 9/2014 | Jensen | ...................... | G01N 9/36 701/34.4 |
| 8,924,094 B2 * | 12/2014 | Faivre | .................. | G01G 19/083 172/465 |
| 8,983,738 B2 * | 3/2015 | Avitzur | .......................... | 701/23 |
| 9,014,925 B2 * | 4/2015 | Clar | .......................... | E02F 5/32 239/172 |

(Continued)

*Primary Examiner* — Truc M Do
(74) *Attorney, Agent, or Firm* — Miller, Mathias & Hull LLP; J. Glenn Waterfield

(57) ABSTRACT

A computer-implemented method for determining a cut location for a machine implement is provided. The method may include comparing a target cut volume to a projected cut volume associated with each boundary of a selected bin, designating the cut location as the boundary most closely approximating the target cut volume if both of the projected cut volumes at the boundaries are either greater than or less than the target cut volume, and designating the cut location as an average of the boundaries if the projected cut volumes at the boundaries are greater than and less than the target cut volume.

20 Claims, 4 Drawing Sheets

(56) References Cited

U.S. PATENT DOCUMENTS

| | | | |
|---|---|---|---|
| 9,098,087 B2* | 8/2015 | Friend | G05F 1/0276 |
| 2002/0162668 A1* | 11/2002 | Carlson | E02F 3/847 |
| | | | 172/4.5 |
| 2007/0260380 A1* | 11/2007 | Mintah | E02F 9/2029 |
| | | | 701/50 |
| 2007/0299590 A1* | 12/2007 | Shull | E02F 3/841 |
| | | | 701/50 |
| 2008/0133128 A1* | 6/2008 | Koch | E02F 3/435 |
| | | | 37/348 |
| 2008/0195269 A1* | 8/2008 | Lacy | B61L 3/006 |
| | | | 701/24 |
| 2008/0262988 A1* | 10/2008 | Williams | G06N 3/12 |
| | | | 706/13 |
| 2011/0153117 A1* | 6/2011 | Koch | E02F 9/2054 |
| | | | 701/2 |
| 2011/0288769 A1* | 11/2011 | Gudat | G06Q 10/047 |
| | | | 701/532 |
| 2012/0173090 A1* | 7/2012 | Corcoran | G06Q 10/063 |
| | | | 701/50 |
| 2013/0006484 A1* | 1/2013 | Avitzur | E02F 9/205 |
| | | | 701/50 |
| 2014/0012404 A1 | 1/2014 | Taylor et al. | |
| 2014/0088838 A1* | 3/2014 | Furem | B65G 67/04 |
| | | | 701/50 |
| 2015/0276468 A1* | 10/2015 | Jaeger | G01G 9/00 |
| | | | 382/154 |

* cited by examiner

SUB-BIN REFINEMENT FOR AUTONOMOUS MACHINES

TECHNICAL FIELD

The present disclosure relates generally to planning cut locations for machines, and more particularly, to methods and systems for determining cut locations for autonomous machines based on sub-bin cut volume analysis.

BACKGROUND

Machines such as, for example, track-type tractors, dozers, motor graders, wheel loaders, and the like, are used to perform a variety of tasks. For example, these machines may be used to move material and/or alter work surfaces at a worksite. The machines may be manned machines, but may also be autonomous or semi-autonomous vehicles that perform these tasks in response to commands remotely or locally generated as part of a work plan for the machines. The machines may receive instructions in accordance with the work plan to perform operations, including digging, loosening, carrying, and any other manipulation of materials at the worksite.

It may be desirable to ensure that the machines perform these operations such that the materials are moved in an efficient manner. More particularly, in repetitive operations, it may be especially desirable to ensure that the locations at which the machines begin to alter the work surface and/or the profiles along which the machines alter the work surface are chosen such that the machines function efficiently. Some conventional systems plan cut locations based on predetermined cut volume estimations. Such systems often employ algorithms which digitalize a worksite into discrete bins or grids to facilitate any necessary computations.

While such algorithms greatly assist in the planning process, there is still room for improvement. For instance, due to the discrete nature of the calculations, precision can be somewhat compromised. One solution for improving precision is to increase the resolution or the number of bins or grids per area of a worksite. By reducing the area or size per bin or grid, a cut location can be more precisely and accurately determined. However, increasing the resolution also significantly increases the number of calculations required per cut location. The increase in computational load would either burden existing control systems, or demand substantial costs for implementing hardware suited to support the added computations.

In view of the foregoing inefficiencies and disadvantages associated with conventional autonomous machines and control systems therefor, a need exists for control systems capable of providing improved precision without substantially increasing computational load.

SUMMARY OF THE DISCLOSURE

In one aspect of the present disclosure, a computer-implemented method for determining a cut location for a machine implement is provided. The method may include comparing a target cut volume to a projected cut volume associated with each boundary of a selected bin, designating the cut location as the boundary most closely approximating the target cut volume if both of the projected cut volumes at the boundaries are either greater than or less than the target cut volume, and designating the cut location as an average of the boundaries if the projected cut volumes at the boundaries are greater than and less than the target cut volume.

In another aspect of the present disclosure, a control system for determining a cut location for a machine implement is provided. The control system may include at least a memory and a controller in communication with the memory. The memory may be configured to retrievably store one or more algorithms. Based on the one or more algorithms, the controller may be configured to at least test each boundary of a selected bin and corresponding projected cut volumes in relation to a target cut volume, designate the cut location as the boundary most closely approximating the target cut volume if both of the projected cut volumes at the boundaries are either greater than or less than the target cut volume, and designate the cut location as an average of the boundaries if the projected cut volumes at the boundaries are greater than and less than the target cut volume.

In yet another aspect of the present disclosure, a controller for determining a cut location for a machine implement is provided. The controller may include at least a boundary test module, a boundary selection module, and a boundary average calculation module. The boundary test module may be configured to compare a target cut volume to a projected cut volume associated with each boundary of a selected bin. The boundary selection module may be configured to designate the cut location as the boundary most closely approximating the target cut volume if the boundary test module indicates both of the projected cut volumes at the boundaries to be either greater than or less than the target cut volume. The boundary average calculation module may be configured to designate the cut location as an average of the boundaries if the boundary test module indicates the projected cut volumes at the boundaries to be greater than and less than the target cut volume.

DETAILED DESCRIPTION

Although the following sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent (other than the language of the claims).

To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Figure 1:
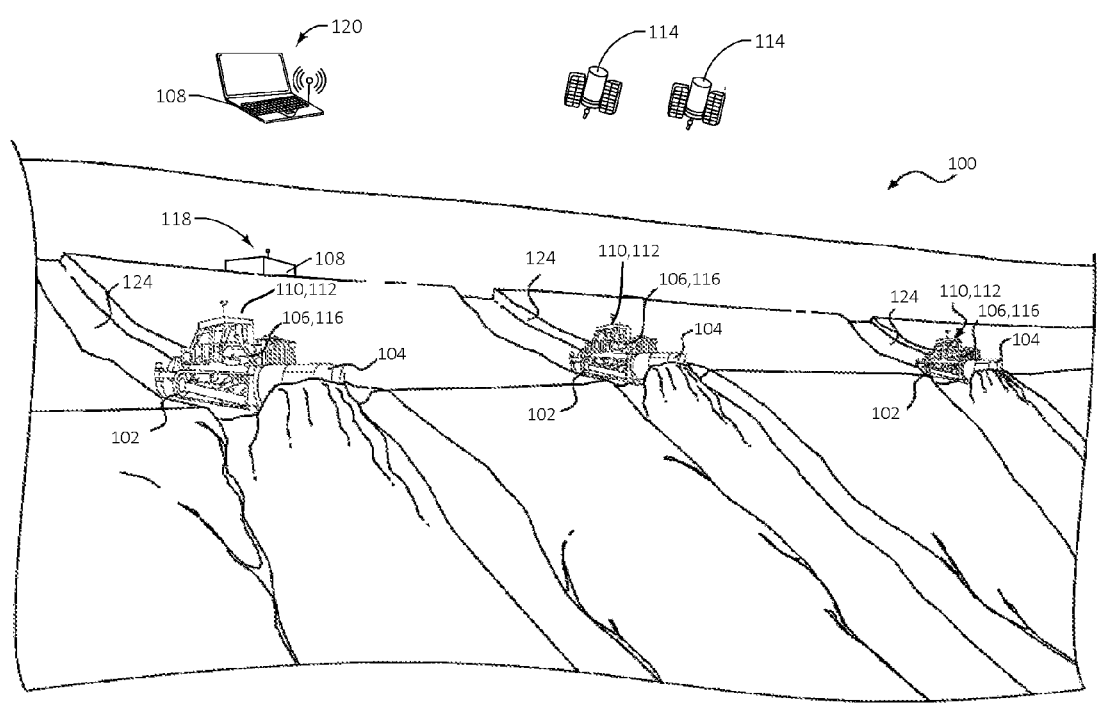
FIG. 1 is a pictorial illustration of an exemplary disclosed worksite.

Referring now to FIG. 1, one exemplary worksite 100 is illustrated with one or more machines 102 performing predetermined tasks. The worksite 100 may include, for example, a mine site, a landfill, a quarry, a construction site, or any other type of worksite. The predetermined task may be associated with altering the geography at the worksite 100, such as a dozing operation, a grading operation, a leveling operation, a bulk material removal operation, or any other type of operation that results in geographical modifications within the worksite 100. The machines 102 may be mobile machines configured to perform operations associated with industries related to mining, construction, farming, or any other industry known in the art. The machines 102 depicted in FIG. 1, for example, may embody earth moving machines, such as dozers having blades or other work tools or implements 104 movable by way of one or more actuators 106. The machines 102 may also include manned machines or any type of autonomous or semi-autonomous machines.

The overall operations of the machines 102 and the machine implements 104 within the worksite 100 may be managed by a control system 108 that is at least partially in communication with the machines 102. Moreover, each of the machines 102 may include any one or more of a variety of feedback devices 110 capable of signaling, tracking, monitoring, or otherwise communicating relevant machine information to the control system 108. For example, each machine 102 may include a locating device 112 configured to communicate with one or more satellites 114, which in turn, may communicate to the control system 108 various information pertaining to the position and/or orientation of the machines 102 relative to the worksite 100. Each machine 102 may additionally include one or more implement sensors 116 configured to track and communicate position and/or orientation information of the implements 104 to the control system 108.

The control system 108 may be implemented in any number of different arrangements. For example, the control system 108 may be at least partially implemented at a command center 118 situated locally or remotely relative to the worksite 100 with sufficient means for communicating with the machines 102, for example, via satellites 114, or the like. Additionally or alternatively, the control system 108 may be implemented using one or more computing devices 120 with means for communicating with one or more of the machines 102 or one or more command centers 118 that may be locally and/or remotely situated relative to the worksite 100. In still further alternatives, the control system 108 may be implemented on-board any one or more of the machines 102 that are also provided within the worksite 100. Other suitable modes of implementing the control system 108 are possible and will be understood by those of ordinary skill in the art.

Using any of the foregoing arrangements, the control system 108 may generally be configured to monitor the positions of the machines 102 and/or machine implements 104 relative to the worksite 100 and a predetermined target operation, and provide instructions for controlling the machines 102 and/or machine implements 104 in an efficient manner in executing the target operation. In certain embodiments, the machines 102 may be configured to excavate areas of a worksite 100 according to one or more predefined excavation plans. For example, the excavation plans may include, among other things, determining a location, size, and shape of a plurality of cuts into an intended work surface or action space 122 at the worksite 100 along a plurality of spaced apart locations known as slots 124. In such embodiments, the control system 108 may function as a means for planning the excavation, for instance, to determine a location, size, and shape of the cuts into the action space 122 within the slots 124. While described in connection with slot-based excavation planning, the control system 108 may similarly be employed in conjunction with other types of action spaces 122.

Figure 2:
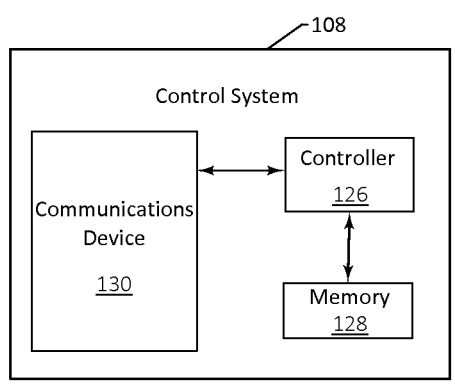
FIG. 2 is a diagrammatic illustration of an exemplary control system that may be used at a worksite.

Turning to FIG. 2, one exemplary embodiment of a control system 108 that may be used in conjunction with the worksite 100 of FIG. 1 is diagrammatically provided. As shown, the control system 108 may generally include, among other things, a controller 126, a memory 128, and a communications device 130. More specifically, the controller 126 may be configured to operate according to one or more algorithms that are retrievably stored within the memory 128. The memory 128 may be provided on-board the controller 126, external to the controller 126, or otherwise in communication therewith. The communications device 130 may be configured to enable the controller 126 to communicate with one or more of the machines 102, and provide information pertaining to the position and/or orientation of the machines 102 and the machine implements 104, for example, via satellites 114, or any other suitable means of communication. Moreover, the controller 126 may be implemented using any one or more of a processor, a microprocessor, a microcontroller, or any other suitable means for executing instructions stored within the memory 128. Additionally, the memory 128 may include non-transitory computer-readable medium or memory, such as a disc drive, flash drive, optical memory, read-only memory (ROM), or the like.

Figure 3:
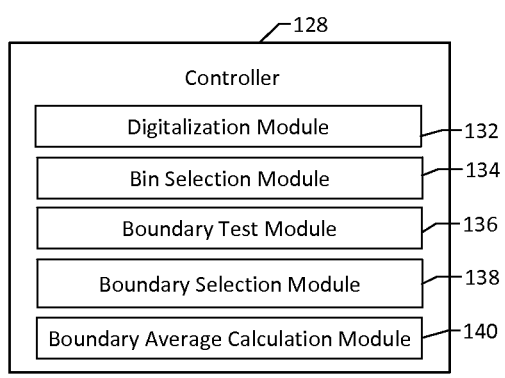
FIG. 3 is a diagrammatic illustration of an exemplary controller that may be used at a worksite.

As further shown in FIG. 3, the controller 126 may be configured to determine a cut location in an action space 122 according to a sub-bin refinement approach, or one or more algorithms which may generally be categorized into, for example, a digitalization module 132, a bin selection module 134, a boundary test module 136, a boundary selection module 138, and a boundary average calculation module 140. With reference to exemplary diagram of FIG. 4, the digitalization module 132 may configure the controller 126 to digitalize an action space 122 into a plurality of grids or bins 142, where each bin 142 is equal in size and increment, such as in units of length, and encompasses a range of potential cut locations, and where each cut location is associated with a projected cut volume. Among the bins 142 digitalized by the digitalization module 132, the bin selection module 134 may configure the controller 126 to initially select the bin 142 having projected cut volumes that would best approximate the target cut volume. The boundary test module 136 may further refine the cut location analyses by configuring the controller 126 to perform boundary tests on each boundary 144 of the selected bin 142.

Figure 4:
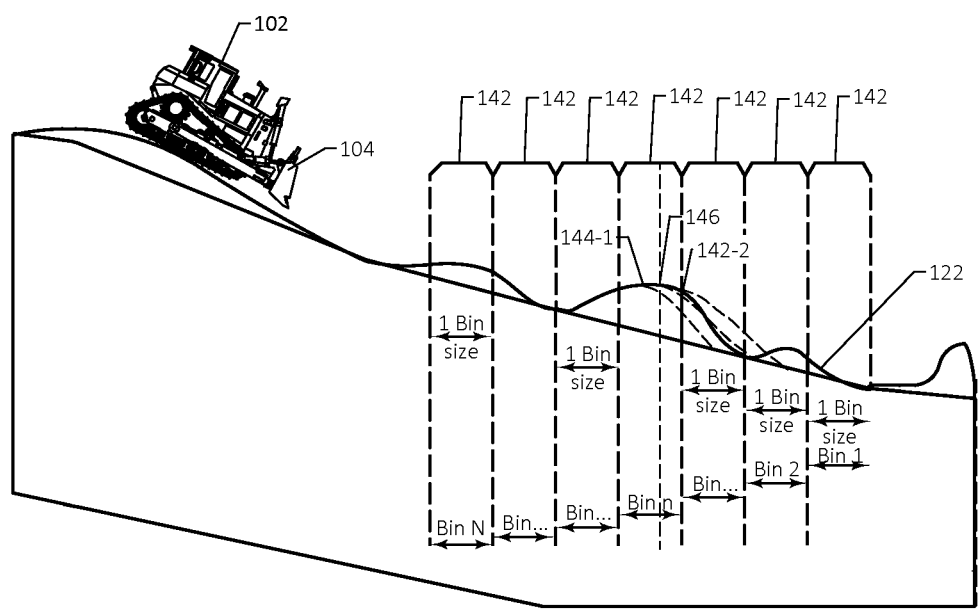
FIG. 4 is a pictorial illustration of a simulation of a potential cut at a worksite that may be generated by a control system of the present disclosure.

In particular, the boundary test module 136 may configure the controller 126 to compare the projected cut volume at each of the boundaries 144 of the selected bin 142 to the target cut volume. If the boundary test module 136 indicates that the projected cut volumes at the boundaries 144 are both greater than the target cut volume or both less than the target cut volume, the boundary selection module 138 may configure the controller 126 to designate the final cut location as the boundary 144 with the projected cut volume most closely approximating the target cut volume. If, however, the boundary test module 136 indicates that the projected cut volume at one boundary 144 is greater than the target cut volume, and that the projected cut volume at the other boundary 144 is less than the target cut volume, the boundary average calculation module 140 may configure the controller 126 to designate the final cut location as the average of the boundaries 144. More particularly, the boundary average calculation module 140 may perform an interpolation of at least the two boundary points 144, assign weights to each of the boundaries 144 based on the interpolation, and calculate an average of the weighted boundaries 144 to be designated as the final cut location, for example, at final cut location 146 as shown in FIG. 4.

Additionally or optionally, the control system 108 and/or the controller 126 may further be configured to track the position and/or orientation of the machines 102 and/or the machine implements 104, track previously engaged cut locations, communicate instructions to the machines 102 and/or machine implements 104 for engaging cut locations, such as via an additional communications module 130, and the like. Moreover, previously tracked information may be at least temporarily stored within memory 128. Furthermore, to further simplify calculations, the control system 108 may convert a target cut volume into one or more predefined criteria or thresholds against which the boundary cut locations of the bins 142 may be directly compared, for instance, without having to calculate or assess the projected cut volume per iteration of the above processes. Other variations and modifications to the algorithms or methods will be apparent to those of ordinary skill in the art. One exemplary algorithm or method by which the controller 126 may be operated to determine a cut location based on the sub-bin refinement approach is discussed in more detail below.

INDUSTRIAL APPLICABILITY

In general terms, the present disclosure sets forth methods, devices and systems for volume-based cut planning and material moving operations where there are motivations to improve productivity and efficiency. Although applicable to any type of machine, the present disclosure may be particularly applicable to autonomously or semi-autonomously controlled dozing machines where the dozing machines are controlled along particular travel routes within a worksite to excavate materials. Moreover, the present disclosure may provide excavation or cut planning with improved precision by enabling sub-bin refinement without adding a significant computational load or burden on the control system. By providing more refined control without adding complexity, cut locations may be determined and volume-based excavation work may be carried out with improved productivity and efficiency.

Figure 5:
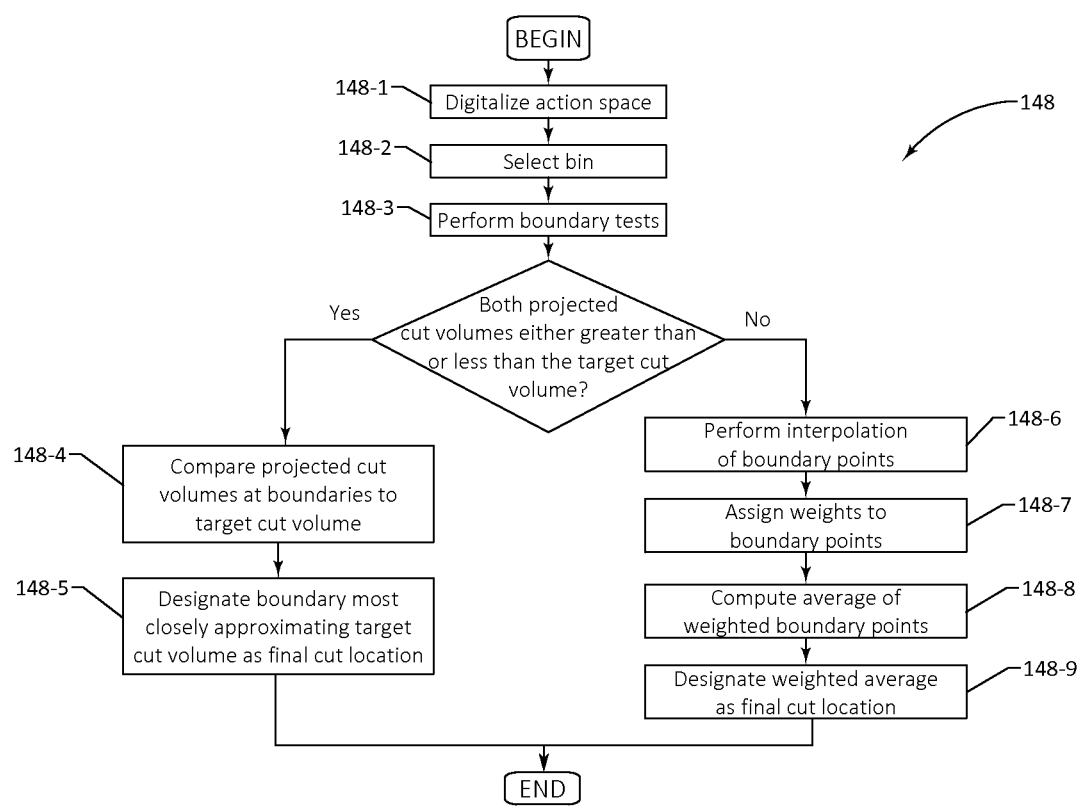
FIG. 5 is a flowchart depicting an exemplary disclosed method that may be performed by a control system of the present disclosure.

One exemplary algorithm or computer-implemented method 148 for determining a cut location is diagrammatically provided in FIG. 5, according to which, for example, the control system 108 and the controller 126 may be configured to operate. With reference to FIG. 4 and as shown in block 148-1 of FIG. 5, the controller 126 may initially digitalize a given action space 122 into a plurality of grids or bins 142 such that each bin 142 is equal in size or length, and such that each bin 142 encompasses a range of potential cut locations. In addition, each cut location may be associated with a projected cut volume, which may be calculated by the controller 126 and/or retrieved from predetermined data or maps stored within memory 128 associated with the controller 126. Based on the bins 142 digitalized in block 148-1, the controller 126 in block 148-2 may be configured to select the bin 142 with corresponding projected cut volumes best suited to approximate a desired or target cut volume. More particularly, the controller 126 may perform comparisons between the projected cut volumes of the bins 142 and the target cut volume to determine the most efficient bin 142 to begin with.

Once a starting bin 142 is selected, the controller 126 in block 148-3 may be configured to perform a boundary test on each boundary 144 of the selected bin 142. In particular, the controller 126 may determine a first projected cut volume corresponding to a first cut location at a first boundary 144-1 of the selected bin 142, as well as a second projected cut volume corresponding to a second cut location at a second boundary 144-2 of the selected bin 142. The controller 126 may additionally compare each of the first and second projected cut volumes against the target cut volume to determine whether the respective projected cut volume is greater than or less than the target cut volume. If both of the first and second projected cut volumes are greater than the target cut volume, or if both of the first and second projected cut volumes are less than the target cut volume, the controller 126 may proceed to operate according to block 148-4. In block 148-4, the controller 126 may be configured to compare the first projected cut volume to the second projected cut volume, and determine which of the two projected cut volumes more closely approximates the target cut volume. Based on the comparison in block 148-4, the controller 126 in block 148-5 may designate one of the boundaries 144 as the final cut location. For example, if the first projected cut volume is a better approximation of the target cut volume than the second projected cut volume, the first boundary 144-1 may be designated as the final cut location. Alternatively, if the second projected cut volume is a better approximation, the second boundary 144-2 may be designated as the final cut location.

If, however, one of the first and second projected cut volumes is greater than the target cut volume, while the remaining one of the first and second projected cut volumes is less than the target cut volume, the controller 126 may be configured to designate the final cut location based on a calculated average, such as a weighted average, of the boundaries or boundary points 144. For example, according to block 148-6, the controller 126 may be configured to perform an interpolation between at least the two boundary points 144, or across other bins 142, and in block 148-7, the controller 126 may be configured to assign weights to the boundary points 144 based on that interpolation. More particularly, the interpolation and weighting schemes may be computed based at least partially on the size or length of the bins 142, the relative cut locations, the corresponding cut volumes, and the like. In block 148-8, the controller 126 may be configured to compute an average of those weighted boundary points 144, and in block 148-9, the controller 126 may be configured to designate the weighted average of the boundary points 144 as the final cut location, for example, at final cut location 146 as shown in FIG. 4.

Additionally or optionally, the method 148 may further configure the control system 108 and the controller 126 to track the position and/or orientation of the machines 102 and/or the machine implements 104, track previously engaged cut locations, communicate instructions to the machines 102 and/or machine implements 104 for engaging cut locations, and the like. Moreover, previously tracked information may be at least temporarily stored within memory 128. Furthermore, to further simplify calculations, the control system 108 may convert a target cut volume into one or more predefined criteria or thresholds against which the boundary cut locations of the bins 142 may be directly compared, for instance, without having to calculate or assess the projected cut volume per iteration of the above processes.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A computer-implemented method for determining a cut location for a machine implement, comprising:
   comparing, by a controller, a target cut volume to a projected cut volume associated with each boundary of a selected bin;
   designating, by the controller, the cut location as the boundary most closely approximating the target cut volume if both of the projected cut volumes at the boundaries are either greater than or less than the target cut volume; and
   designating, by the controller, the cut location as an average of the boundaries if the projected cut volumes at the boundaries are greater than and less than the target cut volume; and
   instructing, by the controller, the machine to execute a cut at the designated cut location.

2. The computer-implemented method of claim 1, wherein the selected bin is selected from a plurality of bins corresponding to a digitalization of an action space, each of the plurality of bins being equal in size and including a range of cut locations, each cut location having a corresponding projected cut volume.

3. The computer-implemented method of claim 2, wherein the selected bin is selected such that the associated range of cut locations has corresponding projected cut volumes most closely approximating the target cut volume.

4. The computer-implemented method of claim 1, wherein the average of the boundaries is a weighted average.

5. The computer-implemented method of claim 4, wherein the weighted average is determined by performing an interpolation of at least the boundaries of the selected bin, assigning a weight to each of the boundaries based on the interpolation, and calculating an average of the weighted boundaries.

6. The computer-implemented method of claim 1, further tracking a location of the machine implement and previously engaged cut locations.

7. The computer-implemented method of claim 1, further communicating instructions to the machine implement for engaging a cut at the cut location.

8. A control system for determining a cut location for a machine implement, comprising:
   a memory configured to retrievably store one or more algorithms; and
   a controller in communication with the memory and, based on the one or more algorithms, configured to at least:
   test each boundary of a selected bin and corresponding projected cut volumes in relation to a target cut volume,
   designate the cut location as the boundary most closely approximating the target cut volume if both of the projected cut volumes at the boundaries are either greater than or less than the target cut volume,
   designate the cut location as an average of the boundaries if the projected cut volumes at the boundaries are greater than and less than the target cut volume; and
   instruct the machine to execute a cut at the designated cut location.

9. The control system of claim 8, wherein the controller is configured to select the selected bin from a plurality of bins corresponding to a digitalization of an action space, each of the plurality of bins being equal in size and including a range of cut locations, each cut location having a corresponding projected cut volume.

10. The control system of claim 9, wherein the controller is configured to select the selected bin such that the associated range of cut locations has corresponding projected cut volumes most closely approximating the target cut volume.

11. The control system of claim 8, wherein the controller is configured to determine the average of the boundaries based on a weighted average of the boundaries.

12. The control system of claim 11, wherein the controller is configured to determine the weighted average by performing an interpolation of at least the boundaries of the selected bin, assigning a weight to each of the boundaries based on the interpolation, and calculating an average of the weighted boundaries.

13. The control system of claim 8, wherein the controller is configured to track a location of the machine implement and previously engaged cut locations.

14. The control system of claim 8, wherein the controller is configured to communicate instructions to the machine implement for engaging a cut at the cut location.

15. A controller for determining a cut location for a machine implement, comprising:
   a boundary test module configured to compare a target cut volume to a projected cut volume associated with each boundary of a selected bin;
   a boundary selection module configured to designate the cut location as the boundary most closely approximating the target cut volume if the boundary test module indicates both of the projected cut volumes at the boundaries to be either greater than or less than the target cut volume;
   a boundary average calculation module configured to designate the cut location as an average of the boundaries if the boundary test module indicates the projected cut volumes at the boundaries to be greater than and less than the target cut volume; and
   wherein the controller further instructs the machine to execute a cut at the designated cut location.

16. The controller of claim 15, further comprising a digitalization module configured to digitalize an action space into a plurality of bins, each of the plurality of bins being equal in size and including a range of cut locations, each cut location having a corresponding projected cut volume.

17. The controller of claim 16, further comprising a bin selection module configured to select the selected bin such that the associated range of cut locations has corresponding projected cut volumes most closely approximating the target cut volume.

18. The controller of claim 15, wherein the boundary average calculation module is configured to calculate a weighted average of the boundaries.

19. The controller of claim 18, wherein the boundary average calculation module is configured to perform an interpolation of at least the boundaries, assign a weight to each of the boundaries based on the interpolation, and designate the cut location based on an average of the weighted boundaries.

20. The controller of claim 15, further comprising a communications module configured to at least track a location of the machine implement and previously engaged cut locations.

* * * * *